United States Patent [19]

Thakrar et al.

[11] Patent Number: 5,074,771
[45] Date of Patent: Dec. 24, 1991

[54] DUAL INJECTION MOLDING APPARATUS

[75] Inventors: Anil C. Thakrar, Camp Hill; John P. Redmond, Mechanicsburg; Paul C. Schubert, Jr., Harrisburg; Clair W. Snyder, Jr., York, all of Pa.

[73] Assignee: AMP Incorporated, Harrisburg, Pa.

[21] Appl. No.: 713,537

[22] Filed: Jun. 6, 1991

Related U.S. Application Data

[60] Continuation of Ser. No. 412,297, Sep. 25, 1989, abandoned, which is a division of Ser. No. 862,902, May 13, 1986, Pat. No. 4,895,529, which is a continuation-in-part of Ser. No. 453,327, Dec. 27, 1982, abandoned.

[51] Int. Cl.$^5$ ............................................. B29C 45/16
[52] U.S. Cl. .................................. 425/130; 264/255; 264/328.7; 425/444; 425/556; 425/577
[58] Field of Search ............... 264/328.7, 328.8, 250, 264/255; 425/444, 556, 577, 588, 130, 134

[56] References Cited

U.S. PATENT DOCUMENTS

| | | | |
|---|---|---|---|
| 3,184,701 | 5/1965 | Ellis | 339/59 |
| 3,838,382 | 9/1974 | Sugar | 339/59 R |
| 3,950,483 | 4/1976 | Spier | 264/328 |
| 4,090,975 | 5/1978 | Herrmann, Jr. | 339/60 M |
| 4,150,866 | 4/1979 | Snyder, Jr. et al. | 339/94 M |
| 4,293,182 | 10/1981 | Schwartz | 339/275 R |
| 4,298,566 | 11/1981 | Naus et al. | 425/577 |
| 4,335,068 | 6/1982 | Hemery | 264/328.8 |
| 4,376,625 | 3/1983 | Eckhardt | 425/564 |
| 4,416,602 | 11/1983 | Neumeister | 264/328.8 |
| 4,531,702 | 7/1985 | Plummer | 425/577 |
| 4,601,528 | 7/1986 | Spier | 339/38 |
| 4,637,674 | 1/1987 | Kobler | 339/94 M |
| 4,664,461 | 5/1987 | Schubert et al. | 339/59 M |
| 4,708,614 | 11/1987 | Schomblond | 425/577 |
| 4,711,752 | 12/1987 | Deacon et al. | 425/577 |
| 4,713,021 | 12/1987 | Kobler | 439/272 |
| 4,726,758 | 2/1988 | Sekine et al. | 264/328.8 |

FOREIGN PATENT DOCUMENTS 968707 9/1964 United Kingdom .

Primary Examiner—Jay H. Woo
Assistant Examiner—James P. Mackey
Attorney, Agent, or Firm—Katherine A. Nelson

[57] ABSTRACT

A mold 300 for making a member having at least one first section of a first material and at least one second section of a second material includes first and second plates or mold halves 332,334 adapted to cooperate with each other when positioned in opposing relationship along a mold-closing axis and reciprocally movable relative to one another along the axis during a molding cycle. The first and second plates or mold halves 332,334 define a member-forming area therein when the mold is in a closed position. Sprues in the first and second plates or mold halves are in communication with the portions of the first and second sections respectively of the member-forming area. An ejector 348 for ejecting an eventually mold member includes one surface defining a boundary of the member-forming area. The ejector is movably disposed in one of the plates and is movable into the member-forming area. The ejector 348 is positionable in a first position such that the first material is introduceable through the at least one first sprue 356 while another surface of the ejector blocks the at least one second sprue. The ejector 348 is then positioned in a second position within the member-forming area such that the second sprue is uncovered. The second material is introduced into the second portion 212 of the member-forming area through the at least one second sprue.

8 Claims, 8 Drawing Sheets

U.S. Patent    Dec. 24, 1991    Sheet 1 of 8    5,074,771
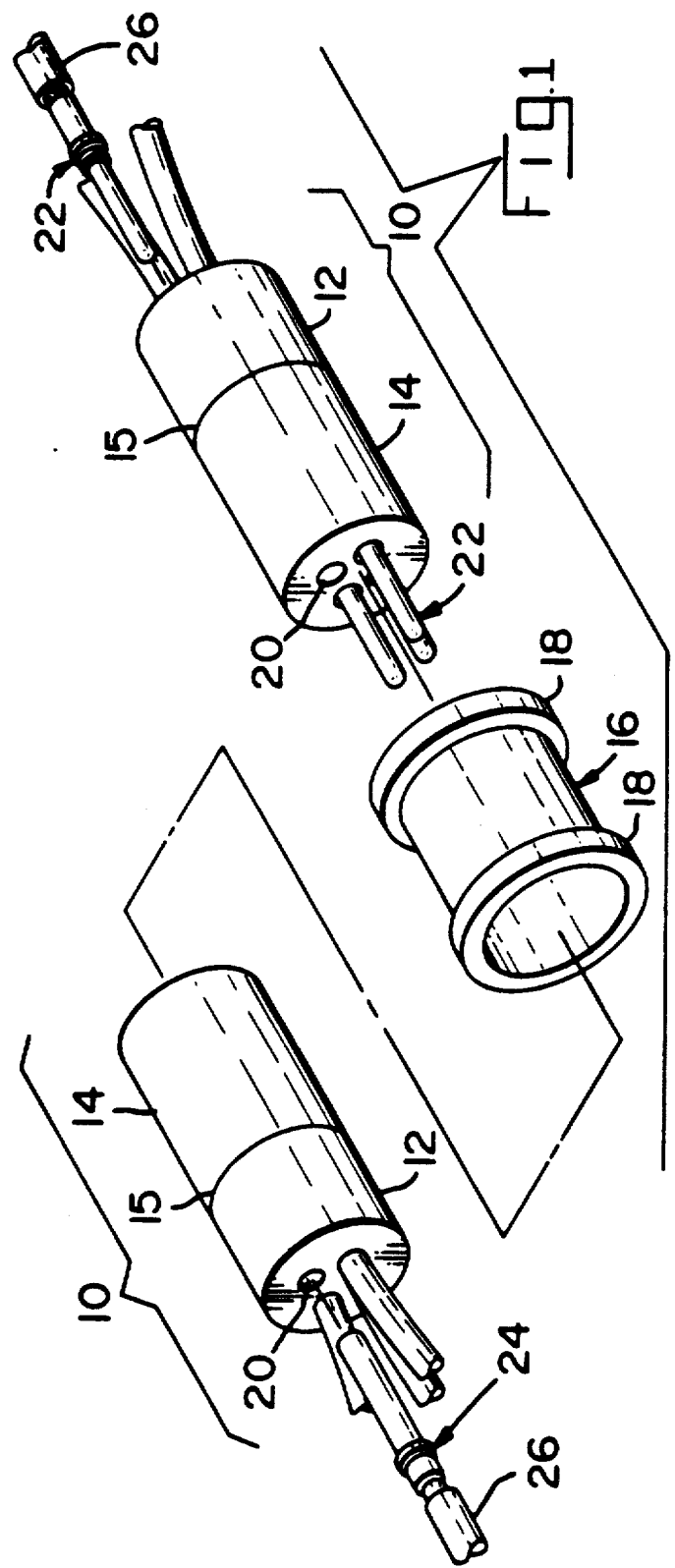
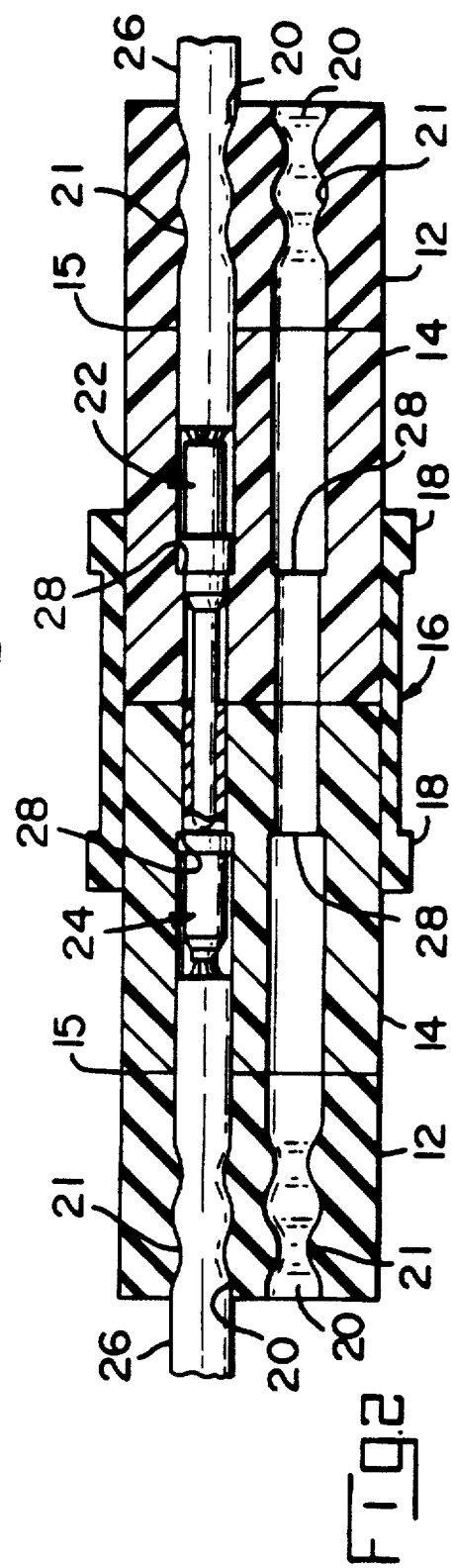

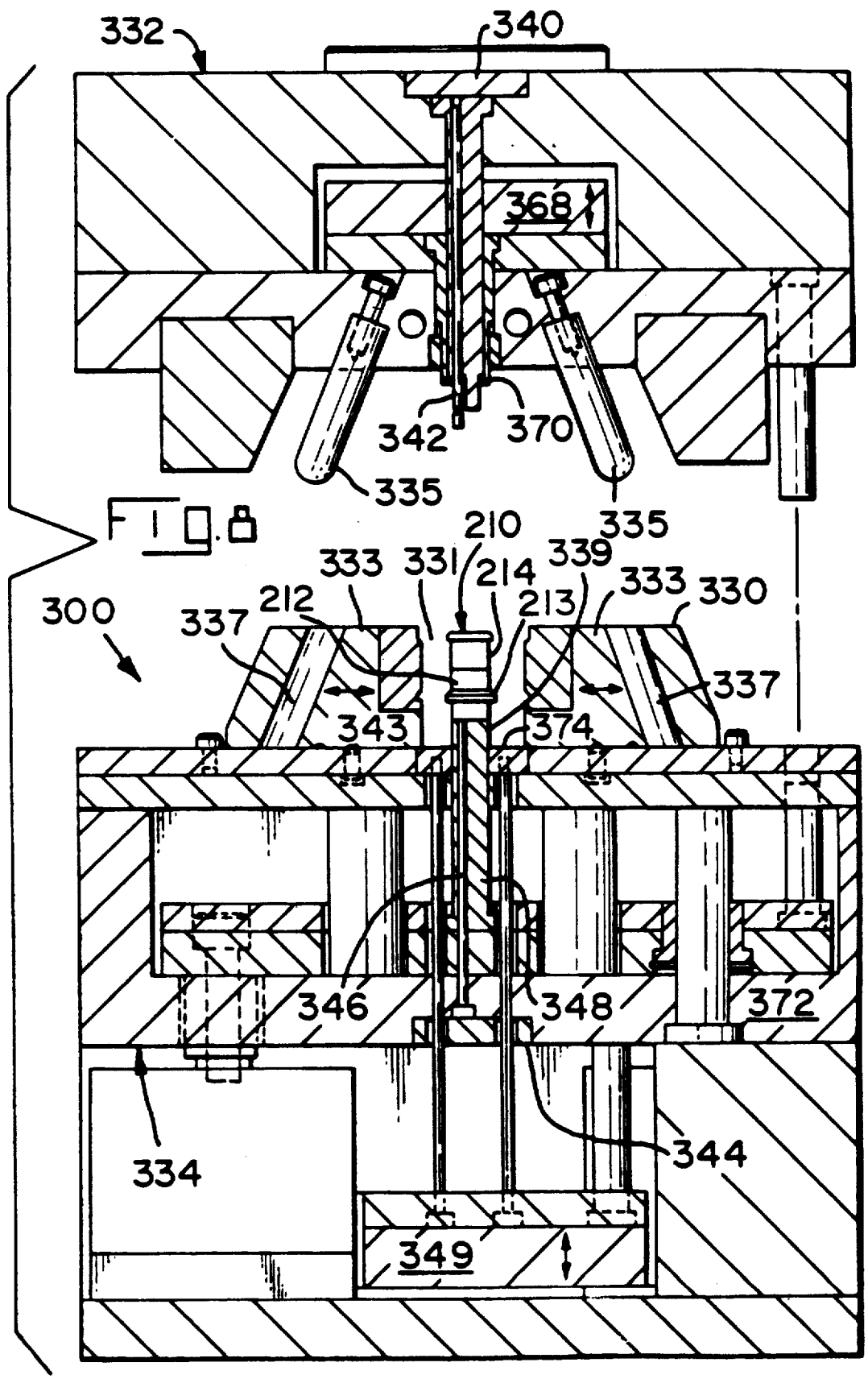

DUAL INJECTION MOLDING APPARATUS

RELATED APPLICATION INFORMATION

This application is a continuation of application Ser. No. 07/412,297 filed Sept. 25, 1989, now abandoned, in turn, a division of application Ser. No. 06/862,902 filed May 13, 1986, now U.S. Pat. No. 4,895,529 in turn a continuation-in-part of application Ser. No. 06/453,327 filed Dec. 27, 1982 now abandoned.

FIELD OF THE INVENTION

This invention relates, generally, to an environmentally sealed connector and more particularly to an electrical connector having a connector housing which is comprised of a rigid section secured at one or both ends thereof to a flexible section.

BACKGROUND OF THE INVENTION

In the electrical connector arts the use of rigid and flexible materials for use in the same connector is old in the art. Such uses, however, were generally in the form of washers, O-rings or physical mating through glues, force fits or threading of flexible to rigid material. The purpose in such a combination is generally to provide environmental sealing or strain relief or to allow for replacement or insertion of contacts. U.S. Pat. No. 4,090,759 "Micro-Miniature Circular High Voltage Connector" issued May 23, 1978 to Hermann, Jr., and U.S. Pat. No. 3,838,382 "Retention System For Electrical Contacts" issued Sept. 24, 1974 to Sugar disclose such uses.

Since the use of rigid and flexible components for contact housings is great, it is desirable to have a contact housing in which the rigid and flexible material are integrally molded so as to become a unitary piece. One patent wherein relatively hard and relatively soft resilient material are used together for insulator bodies is found in British Patent Specification No. 968,707 "Multi-Hardness Resilient Connector Insulator" published Sept. 2, 1964. The insulator bodies were designed to be used in a rigid connector shell.

It is an object of the present invention to produce a connector housing wherein one end is of a rigid material and not merely relatively inflexible and the other end is of a flexible material thereby providing environmental sealing and restraining one end while providing a physically secure base at the remaining end.

It is a further object to have a connector housing wherein the interface between the two materials is relatively smooth and does not separate when pressure is exerted thereon.

It is another object of this invention to provide a connector housing having one section of rigid material secured at one end thereof to a section of flexible material which will accommodate and sealingly engage different wire sizes without the need to exert external pressure by use of rigid connector shell or other means.

In addition it is an object of this invention to provide a connector housing having a second section of flexible material secured to the other end of the rigid material to provide a flexible resilient sealing member for environmentally sealing the interface when the connector housing is mated with a complimentary housing member.

In addition it is an object of this invention to provide a mold for making the connector housings and a cost effective method for making same.

SUMMARY OF THE INVENTION

Accordingly, the present invention is directed to an environmentally sealed electrical connector characterized by a first housing member having at least one passageway therethrough for receiving electrical terminal member, the housing having at least a first portion which is of a rigid material and at least a second portion which is of a flexible resilient material, the portions having a chemical affinity at the interface point therebetween, at least one socket terminal disposed in each terminal receiving passageway in the first housing and the socket terminating to an electrical conductor, a second housing having at least one terminal receiving passageway extending therethrough, the housing having at least a first portion which is of a rigid material and at least a second portion which is of a flexible material, the portions having a chemical affinity at the interface point therebetween, and at least one pin terminal disposed in each terminal receiving passageway in the second housing, the pin terminal terminating to an electrical conductor.

The present invention is further directed to an environmentally sealed connector wherein at least one of the housing members has a flexible resilient sealing member at both ends of the rigid portion, the second flexible portion forming a means for environmentally sealing the interface when the plug and receptacle are mated.

The invention is further directed to a method of and mold for making the above connectors by dual injection molding.

Some of the objects and advantages of the invention having been stated, others will appear as the description proceeds, when taken in connection with the accompanying drawings.

BRIEF DESCRIPTION OF THE DRAWINGS

FIG. 1 is a partly exploded view of the connector of the present invention;

FIG. 2 is a cross-sectional view taken through an assembled connector of the present invention;

FIG. 7 is a partially exploded view of a further alternative embodiment of the present invention;

FIG. 7A is a fragmentary view of another alternative embodiment of the present invention.

FIG. 8 is a cross-sectional view of a mold used for manufacturing the connector of FIG. 4 showing the mold in its open position;

DESCRIPTION OF THE PREFERRED EMBODIMENT

Figure 3:
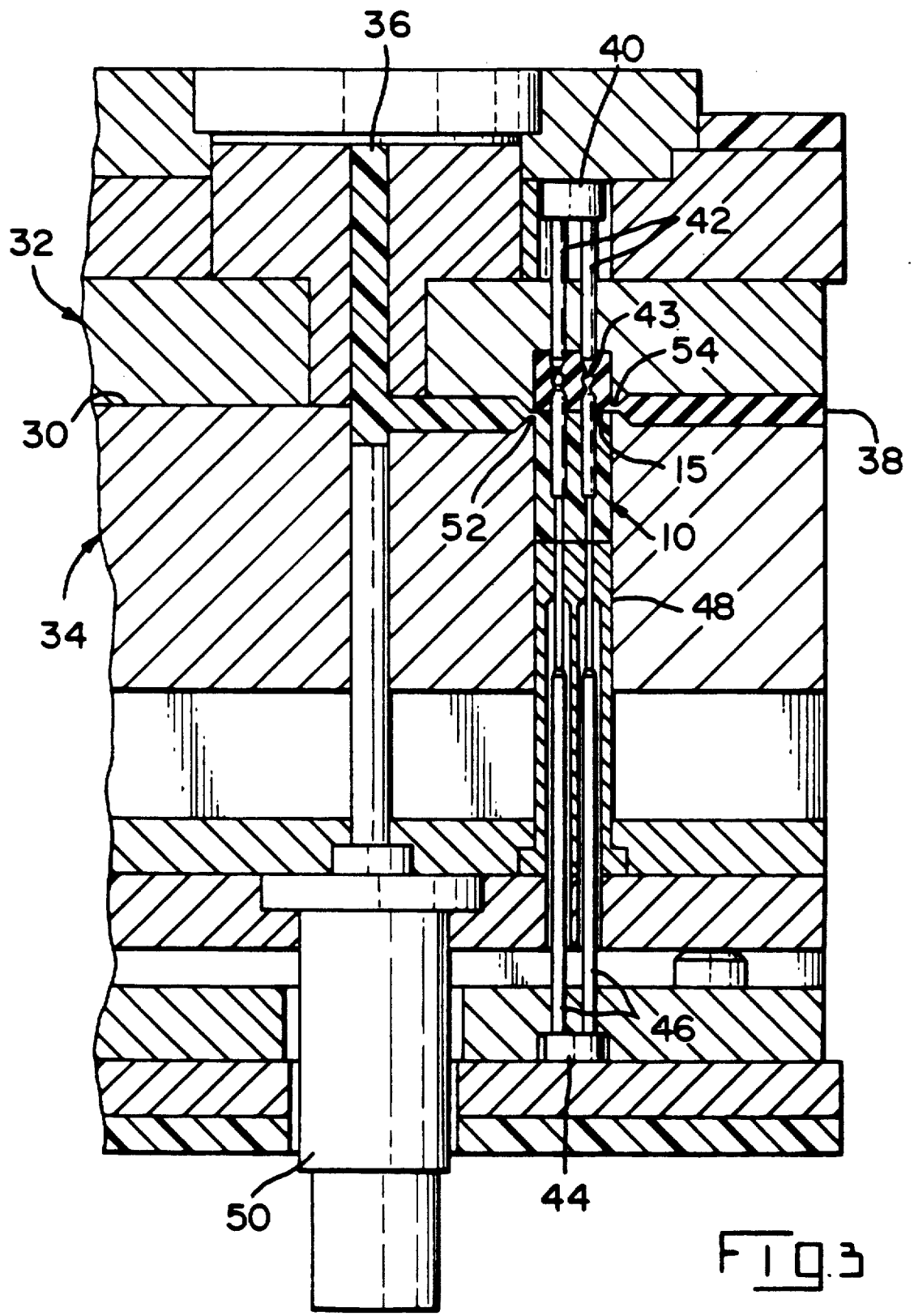
FIG. 3 is a cross-sectional view of a mold showing the manufacturing of the present invention.

FIG. 1 shows an exploded view of the connector of the present invention. The connector housing 10 has two portions, the housing flexible portion 12 and the housing rigid portion 14. Housing mating seal 16 is disposed between the two connector housings 10. Seal 16 provides environmental protection upon mating of the two connector housing halves (shown more clearly in FIG. 2). The housing mating seal 16 has a ridge 18 disposed at either end which additionally helps to rigidly hold the seal 16 onto the housings 10. Connector housings 10 have contact passageways 20 extending therethrough the passageways allowing insertion and/or removal of individual contacts. It is to be understood that the positioning and number of contact passageways 20 may vary without departing from the spirit and scope of the present invention. Also shown is a pin terminal 22 and a socket terminal 24 each having a wire 26 attached thereto. FIG. 1 further shows interface point 15 disposed on each of the connector housings 10 which demarcates the flexible and the rigid portions 12, 14.

A cross-sectional view of an assembled connector of the present invention is shown in FIG. 2. In this view it can be seen how the housing mating seal 16 is fitted over the exterior of the housing rigid portions 14. Also shown are the wires 26 which pass through the contact passageways 20 and are relatively rigidly held in place by a series of annular protrusions 21 extending into terminal receiving passageway 20 in the flexible portion 12. Protrusions 21 form an environmentally tight seal around the exterior of the wires 26 as well as providing strain relief. In addition to providing strain relief and sealing, the flexible protrusions allow the same housing member to be used for a plurality of sizes of wires while maintaining an environmental seal around the wires. Disposed in the interior of each passageway 20 are ledges 28 which provide for physical stops for the pin terminal 22 as well as the socket terminal 24. In this manner of construction the housings 10 are of a hermaphroditic nature, the pin or the socket terminals being usable in any of the housings 10.

The connector is assembled by inserting wires having terminals attached thereto into the flexible portion 12 until the terminals are seated against ledges 28 in rigid portion 14.

FIG. 3 shows a cross-sectional view of a molding portion of a machine utilized in the construction of the housing 10. The operation and general characteristics of the mold are generally known by one skilled in the art and therefore only a brief description will be found below. The mold has a parting line 30 which denotes the "A" end plate or mold half 32 from the "B" plate or mold half 34. Also shown is the position for injection of the rigid material 36 as well as the flexible material 38. Disposed on the mold is the upper pin 40 which has two upper core contact passageway forming pins 42. The number of passageway forming pins 42 is dictated by the number of terminal passageways 20 and may therefore vary accordingly. The lower core pin 44 has lower core terminal passageway forming pins 46 and thereby in conjunction with the upper core terminal passageway forming pins 42 form terminal passageways 20 through the housing 10. Further, the upper core passageway forming pins 42 have core pin indentations 43 disposed therein which are used to form annular protrusions 21 in the connector housing 10. An ejector sleeve 48 is utilized to eject a finished connector housing 10 from the mold as well as control the flow of the rigid and flexible materials 36, 38 as described below. A hydraulic cylinder 50 is used to separate the "A" plate 32 from the "B" plate 34 and from each other as described below.

The manufacturing of the component is accomplished by a closing of the mold plates "A" and "B" 32, 34. The ejector means or ejector sleeve 48 then moves upward to a point just slightly above the lower sprue 52 thereby prohibiting the introduction of rigid material 36 therethrough while leaving the upper sprue 54 open. The soft or flexible material 38 is then injected into the mold and forms the housing flexible portion 12. The ejector sleeve 48 is then retracted to the position shown in FIG. 3 thereby defining the total overall length of the housing 10. The rigid material 36 is then injected through the sprue 52 which forms the housing rigid portion 14. Since the housing flexible portion 12 remains in the upper portion of the mold in the position shown, the gate at the end of sprue 54 is blocked thus preventing additional flexible material 38 from entering into the mold before the introduction of the rigid material 36. Owing to the temperature of the rigid material 36 in relation to the flexible material 38, as well as the material utilized, it is believed a chemical affinity occurs between the two materials at the interface point 15. After the materials are sufficiently cooled the mold opens at the parting line 30 with the top core pins 42 moving outwardly until the housing 10 is out of the cavity. The mold then continues to open pulling the housing 10 from the top core pins 42 such that housing 10 remains in the "B" plate 34. The ejector sleeve 48 is then moved forward and ejects housing 10 from plate 34.

Figure 4:
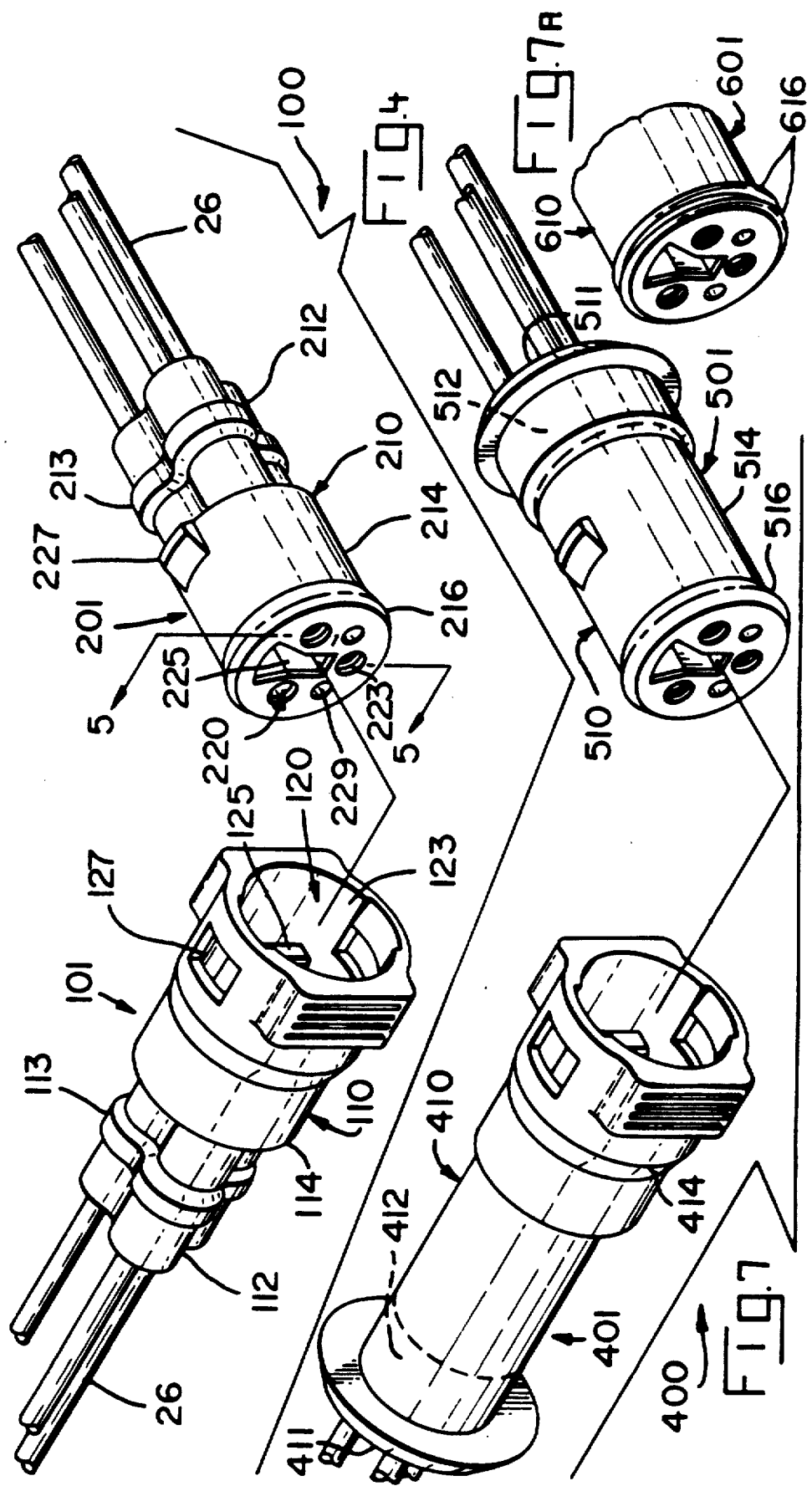
FIG. 4 is partly exploded view of an alternative embodiment of the connector of the present invention.
Figure 5:
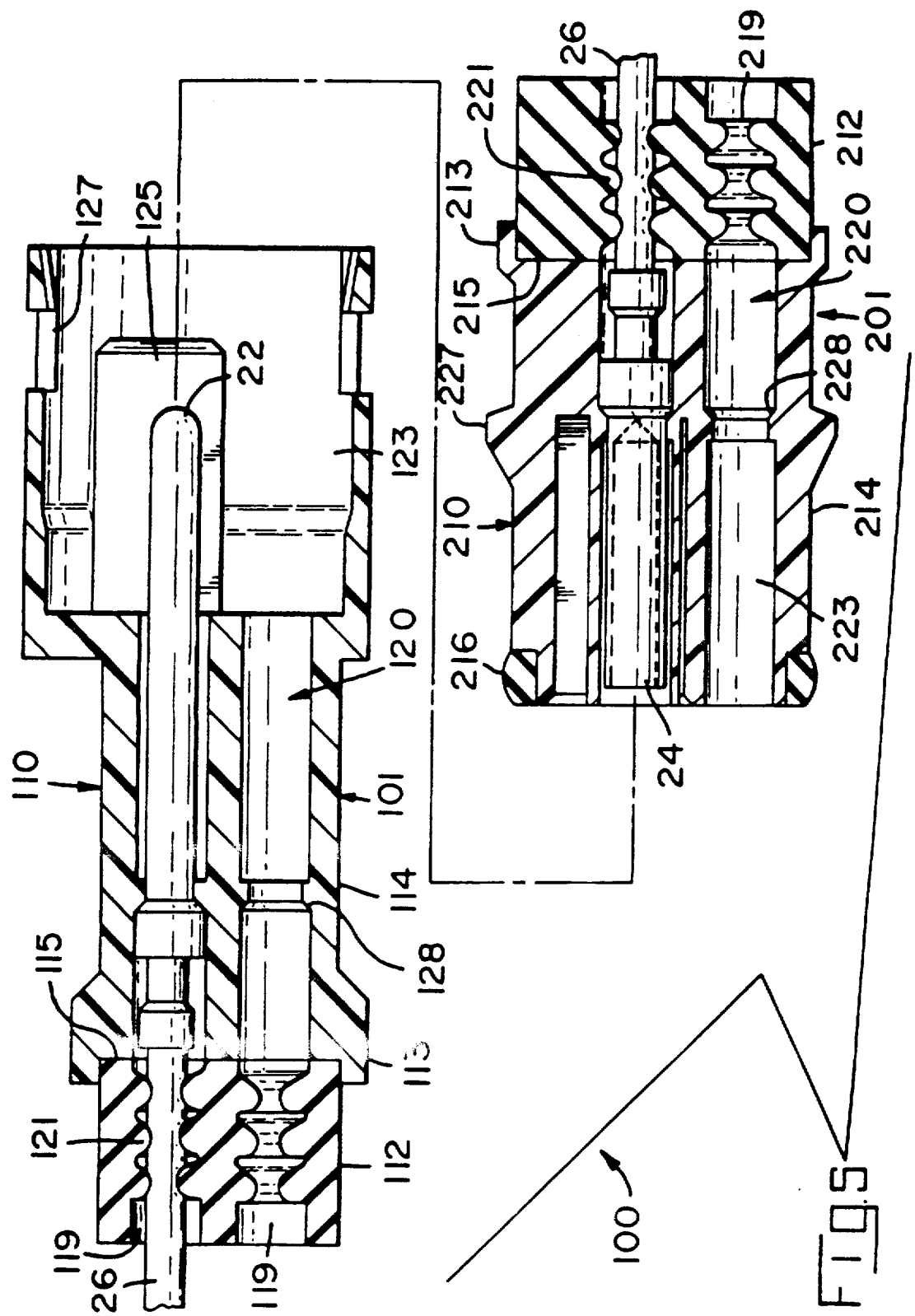
FIG. 5 is a cross-sectional view taken through the unassembled connector of FIG. 4.
Figure 6:
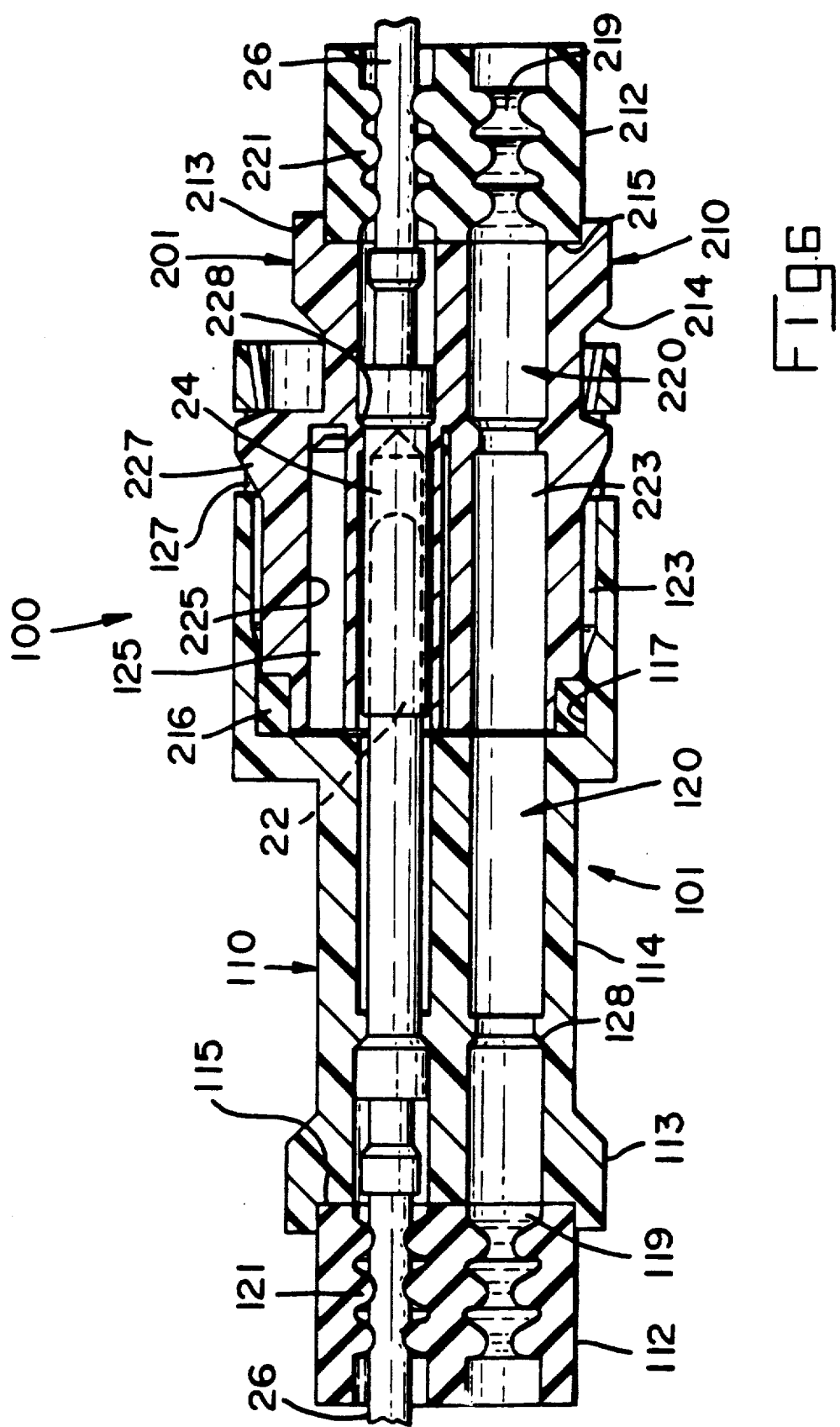
FIG. 6 is a cross-sectional view taken through the assembled connector of FIG. 4.

FIGS. 4, 5 and 6 disclose an alternative embodiment 100 of the environmentally sealed connector, having plug member 101 and receptacle member 201. Plug and receptacle member 101, 201 are comprised of housing members 110, 210, each housing member 110, 210 having flexible portions 112, 212 and rigid portions 114, 214 respectively. Housing members 110, 210 further have at least one electrical terminal receiving passageway 120, 220 extending therethrough, said passageways having flexible portions 119, 219 and rigid portions 123, 223 respectively as best seen in FIGS. 5 and 6. Housing members 110, 210 in alternative embodiment 100 are not hermaphroditic. The mating end of rigid passageway portion 123 of plug member 101 is dimensioned to receive rigid portion 214 of receptacle member 201 when connector 100 is mated. Thus eliminating sleeve member 18 shown in FIG. 1. Plug and receptacle members 101, 201 further have polarizing means to ensure proper alignment and means for locking the portions together. FIG. 4 also shows the use of optional bores 229 which may extend partially into rigid portion 214. Similar bores may be used in rigid portion 114. These bores are used to reduce the amount of material used in molding the housing and to provide additional surface area for purposes of cooling the molded material. As can be seen in FIGS. 5 and 6, rigid portion 114 of plug member 101 has an annular ring 113 which extends partially over the interfacing surface 115 between flexible portion 112 and rigid portion 114. The majority of flexible portion 112 extends rearwardly from the back of rigid portion 114. Plug member 101 further has polarizing member 125 extending into passageway 123, which cooperates with polarizing passageway 225 in receptacle member 201 when the connector is mated. In addition, rigid portion 114 has at least one locking aperture 127 which cooperates with corresponding locking protrusion 227 on receptacle member 201.

Plug portion 101 has a pin terminal member 22 disposed in respective terminal receiving passageways 120, said pin terminals 22 being terminated to a conductor member 26. Terminal 22 is inserted into passageway 120 through flexible portion 119 and into rigid portion 123 until the collar on terminal rests against stop surface 128 in passageway portion 123. Annular protrusions 121 in flexible passageway portion 119 grip the wire to provide an environmental seal and strain relief. Since protrusions 121 are flexible, the same size housing and passageways can accommodate several wire sizes while maintaining the integrity of the environmental seal.

The front portion of receptacle member 201 is further comprised of annular interfacial sealing member 216 having an arcuate sealing surface, formed of same flexible material as flexible portion 212. In this embodiment the arcuate sealing member is integrally molded onto the rigid portion 214 and functions as an O-ring. When the plug and receptacle members 101, 201 are mated, seal 216 is compressed within constricted portion 117 within plug passageway 123 and provides an environmental seal. Rigid portion 214 of receptacle 201 has an annular ring 213 which extends partially over interfacing surfaces 215 between the two materials.

Receptacle member 201 has a socket terminal 24 disposed in each terminal receiving passageway 220, each socket terminal 24 being terminated to a conductor member 26. Socket terminals 24 are inserted into flexible portion 219 of passageways 220 in the same manner as previously described. Passageway portions 219 have annular protrusions 221 which function in the same manner as protrusions 121 in plug member 101. Socket terminal 24 is inserted within passageway 220 until its collar engages stop surface 228 as shown in FIGS. 5 and 6.

When plug and receptacle members 101, 201 are mated as shown in FIG. 6, pin terminals 22 are engaged in socket terminals 24, interfacial seal 216 is in sealing engagement at 117 within plug member 101 and locking protrusion 227 on receptacle member 201 is engaged in locking aperture 127 of plug member 101.

FIG. 7 shows a further alternative embodiment 400 of the connector comprised of plug 401 and receptacle 501. In this embodiment rigid portions 414, 514 of plug housing 410 and receptacle housing 510 extend rearwardly to essentially surround flexible portions 412, 512 (shown in phantom), except at rear surfaces 411, 511. Receptacle 501 includes interfacial seal member 516 at a front end thereof.

FIG. 7A shows a further plug embodiment 601 wherein rigid portion 610 has a plurality of annular interfacial sealing members 616 disposed at the mating end thereof.

Figure 9:
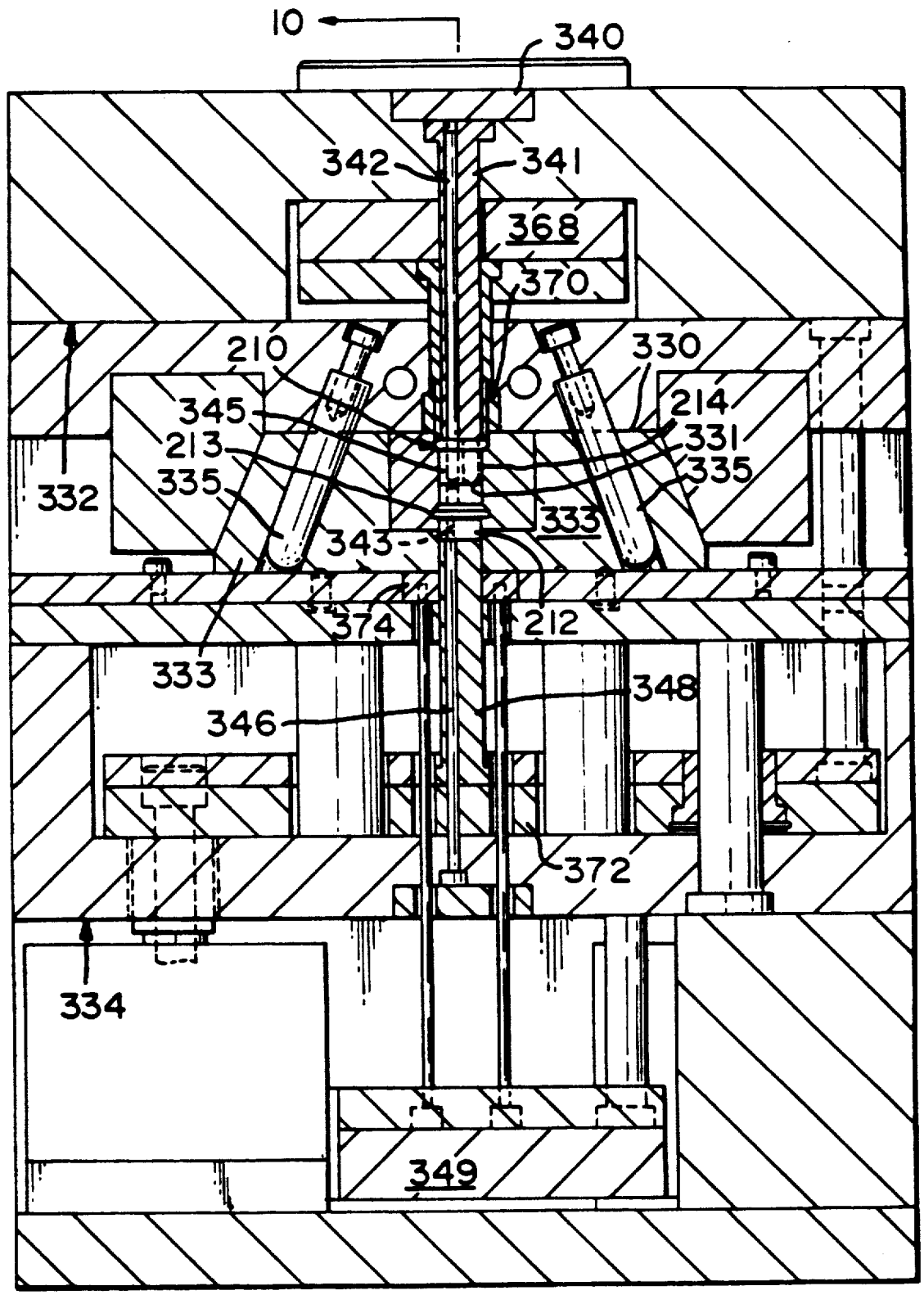
FIG. 9 is a cross-sectional view of the mold of FIG. 8 in its closed position.
Figure 10:
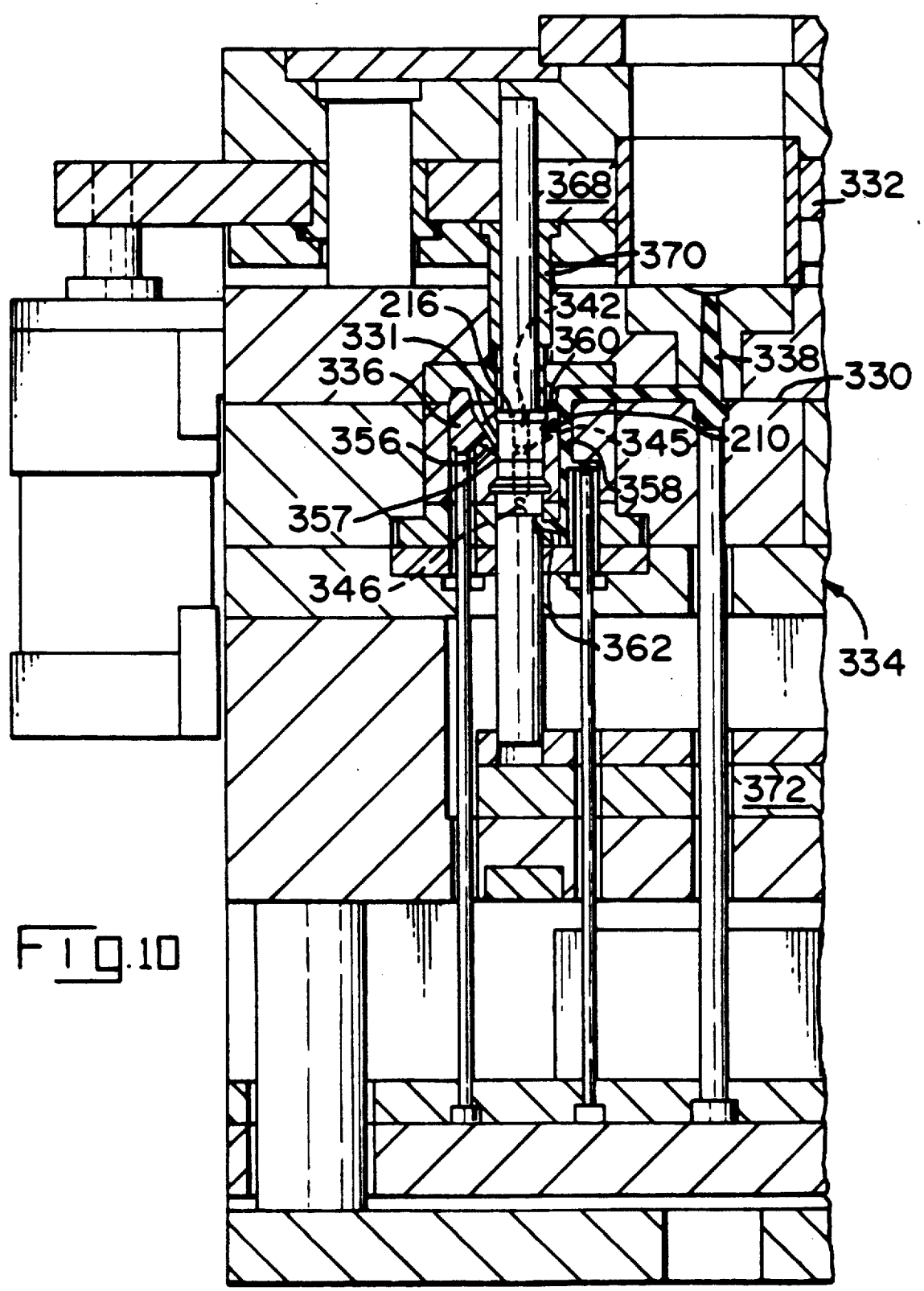
FIG. 10 is a cross-sectional view of the mold taken along line 10—10 of FIG. 9.

FIGS. 8, 9 and 10 illustrate the operation of mold 300 used to form receptacle portion 201 of alternative embodiment 100 wherein flexible material 338 is injected onto both ends of the rigid material 336. FIG. 8 shows mold 300 in its open position, immediately prior to ejection of receptacle portion 201. FIG. 9 shows the formed receptacle portion 201 in the closed mold. FIG. 10 is taken along line 10—10 in FIG. 9 and shows the runner system for injecting rigid and flexible materials 336, 338. Mold 300 is comprised of plate means or mold halves including upper and lower plates or halves 332 and 334 which separate at parting line 330. Upper plate or half 332 contains stationary upper core pin plate 340 on which are mounted core pins 342 which form part of terminal receiving passageway 220; core pin 341 which forms polarizing passageway 225; and core pins (not shown) for forming bores 229 in rigid portion 214.

Lower plate or half 334 contains stationary lower core pin plate 344 on which are mounted core pins 346 for forming the remaining part of terminal receiving passageway 220; and ejector mechanism 348. The number of core pins 346 in lower core pin plate 344 correspond to the number of pins 342 on upper core pin plate 340. When the mold is closed, corresponding core pins 342 and 346 meet at 345 to form continuous pins for forming terminal receiving passageways 220.

Mold 300 is further comprised of two blocks 333, mounted on lower mold plate 334 which together form connector housing forming cavity 331. Blocks 333 have cavities 337 therein for receiving arms 335 which extend from upper mold plate to move blocks 333 into position as mold 300 closes. Blocks 333 move outwardly in a horizontal direction as arms 335 are withdrawn from blocks 333 when mold 300 is opened (indicated by the arrow) to release the external surface of the molded housing from the mold.

FIG. 10 is a view taken at right angles to FIG. 9 and illustrates the sprue means, runner and gate system for forming housing 210. Rigid material 336 is injected into cavity 331 through sprue 356 entering at gate 357. Flexible material 338 is injected into desired locations in cavity 331 through sprue 358 entering at gates 360 and 362.

To mold connector housing 210 in accordance with the invention plate 334 is moved into position against block 332, causing arms 335 to enter bores 337 to move blocks 333 into position to form cavity 331; pin 341 to enter cavity 331 for forming polarizing passageway 225; and core pins 342 to enter cavity 331 and engage respective core pins 346 in lower plate 334.

Plate 368 is then lowered to insert block 370 into upper end of cavity 331 and plate 372 is partially raised to insert end 339 of ejector sleeve 348 into the opposite end of cavity 331, thus preserving these portions of the cavity for subsequent injection of flexible material 338. Rigid material 336 is injected into cavity 331 through sprue 356 to form rigid portion 214. Rigid material 336 is allowed to solidify on its surface prior to removing block 370 and ejector sleeve end 339 to provide space for molding the flexible portions at both the interfacial seal 216 and wire seal 212 areas. Molten flexible material 338 is injected into the desired areas and is allowed to cool. Since the rigid portion 214 is not completely cooled before the second material is introduced into the mold, there is some surface melting of the first material resulting in thermal intermingling of the two materials and consequent molecular affinity at the interfacial areas.

After the housing 210 has cooled sufficiently to retain its shape, mold 300 is opened along parting line 330. Plate 332 is moved away from plate 334 thus removing core pins 342, 341 from the housing and arms 335 from block bores 337 accompanied by movement of blocks 333 to release the outer surfaces of housing member 210. Connector housing member 210 is ejected from lower plate 334 by action of ejector means including ejector sleeve 348 and ejector plate 374 being moved against flexible portion 212 and flange 213 by upward movement of plates 372 and 349 respectively.

Thermosetting as well as thermoplastic materials may be used to make connector housings in accordance with this invention. Thermoplastic materials are preferred, however, because of reduced cycle time needed between successive moldings. With thermoset materials, the mold must be maintained at a high temperature for a sufficient period of time to allow the material to cure. With thermoplastic materials, the mold needs to be cooled for a relatively short period of time to allow the material to set. The type of materials used depend upon the specific application for the connector. Generally thermosetting materials are used whenever the connectors will be used at elevated temperatures. The preferred types of materials are thermoplastics, thermoplastic elastomers and thermosetting rubbers. Fillers that may be added to the rigid materials include conductive as well as nonconductive materials such as metallic particles, conductive nonmetals, metalized nonconductive materials, glass fibers, etc.

To increase the chemical affinity between the two portions of the connector, it is preferred that a similarly based polymer be used in forming the rigid material 36, 336 and flexible material 38, 338. The basic polymer is modified to provide the desired characteristics. Preferably the rigid material is flame retardant filled material and the flexible material is unfilled and may contain antioxidants and other additives for controlling flow and release from the mold. In addition, materials having compatible but different polymer bases may be combined.

Where desired, antioxidants and other additives were added in accordance with the following procedure: fluid additives were added via a fluid pump of known calibrated output. Dry additives were measured and mixed with pellets of the base resin material. A twin screw extruder was used to blend the material prior to entering the mold. Fluid additives are added just prior to the time the dry ingredients left the material hopper and entered the extruder.

The following examples illustrate the invention. They are not to be construed as limitations on the instant invention except as indicated in the appended claims. All compositions are expressed as parts by weight except where specifically indicated otherwise.

EXAMPLE 1

An apparatus such as that shown in FIGS. 8-10 was used to produce connector housings as follows. A quantity of POLYFLAM RPP1174, a polypropylene, containing about 0.1 percent IRGANOX 1010, an antioxidant, and 0.2 percent SEENOX 412S, an antioxidant, was injected into the mold cavity formed with the slides in the forward positions at a pressure of about 70 kg/cm sq. at about 193° C. The slides were then retracted to expose the gates of the areas into which the SANTOPRENE 201-64 a dynamic vulcanizate at about 196° C. was injected at a pressure of about 100 kg/cm sq. The mold was maintained at about 10° C. The total cycle time was between 30 and 80 seconds.

POLYFLAM RPP1174 is a polypropylene available from A. Schulman Inc., Akron, Ohio. IRGANOX 1010 is tetrakis-[methylene 3-(3',5'-di-tert-butyl-4'-hydroxyphenyl)proprionate]methane which is available from CIBA GEIGY, Inc. SEENOX 412S is pentaerythritol tetrakis(b-laurylthiopropionate), and is available from Argus Chemical Division, Witco Chemical Corp., Brooklyn, N.Y. SANTOPRENE 201-64 is a dynamic vulcanizate comprising ethylene-propylene-diene monomer (EPDM) rubber particles with an average size of 0.001 mm dispersed in a matrix of polypropy ne available from Monsanto Polymer Products Company.

EXAMPLE 2

Example 2 was the same as Example 1 except that the POLYFLAM RPP1174 did not contain the antioxidants.

EXAMPLE 3

Example 3 was the same as Example 2 except that the SANTOPRENE 201-64 included about 2.5 percent of 12,500 centistroke SILICONE FLUID, SWS-101. SILICONE FLUID, SWS-101 is a polydimethylsiloxane available from SWS Silicones Corp., Edison, N.J.

EXAMPLE 4

Example 4 was the same as Example 3 except that Santoprene 101-64 was used instead of Santoprene 201-64. The Santoprene 101-64 was injected at about 196° C. at about 100 kg/cm sq.

EXAMPLE 5

Example 5 was carried out in a prototype mold for thermoset materials which was maintained at an average temperature of about 185° C. The first material, a non-reinforced EPDM, was injected with a pressure of about 28 kg/cm sq. This material was allowed to cure for about 20 seconds, then the second material, a 15 percent glass reinforced EPDM, was injected with a pressure of about 49 kg/cm sq. and allowed to cure for about 240 seconds. The completed item was then ejected from the mold.

The following compositions were used for the non-reinforced and reinforced EPDMs.

NON-REINFORCED EPDM

| Component | Amount - Parts by Weight |
|---|---|
| Vistalon 3777[1] | 175 |
| Zinc oxide | 20 |
| Burgess Icecap K[2] | 300 |
| Sunpar 2280[3] | 35 |
| Di-Cup 40KE[4] | 9 |
| Silane A-172[5] | 1.5 |
| Agerite MA[6] | 1.5 |

[1]Vistalon 3777 is a high molecular weight 75 percent oil extended EPDM available from Exxon Chemical Americas, Houston, Texas.
[2]Burgess Icecap K is an anhydrous aluminum silicate available from Burgess Pigment Co., Macon, Georgia.
[3]Sunpar 2280 is a paraffinic oil available from Sun Oil Co., Philadelphia, Pennsylvania.
[4]Di-Cup 40KE is dicumyl peroxide on Burgess KE Clay, 40 percent active, available from Hercules Incorporated, Wilmington, Delaware.
[5]Silane A-172 is a vinyl silane available from Union Carbide Corp., Danbury, Connecticut.
[6]Agerite MA is a polymerized 1,2-dihydro-2,2,4 trimethyl quinoline available from R. K. Vanderbilt, Norwalk, Connecticut.

REINFORCED EPDM

| Component | Amount - Parts by Weight |
|---|---|
| Vistalon 6505[7] | 40 |
| Vistalon 3708[8] | 40 |
| LD 400[9] | 20 |
| Zinc oxide | 20 |
| Suprex Clay[10] | 30 |
| Mistron Vapor Talc[11] | 55 |
| Burgess Icecap K | 45 |
| FEF Black[12] | 20 |
| HAF Black[13] | 20 |
| Sunpar 2280 | 35 |
| Stearic Acid | 1 |
| Glass[14] fibers | 49 |
| Di-Cup 40KE | 9 |
| Silane A 172 | 1.5 |

-continued

| Component | Amount - Parts by Weight |
|---|---|
| Agerite MA | 1.5 |

[7]Vistalon 6505 is a medium viscosity, fast curing EPDM available from Exxon.
[8]Vistalon 3708 is a high viscosity EPDM available from Exxon.
[9]LD 400 is a low density polyethylene available from Exxon.
[10]Suprex Clay is a hydrated aluminum silcate available from J. M. Huber Corp., Macon, Georgia.
[11]Mistron Vapor Talc is magnesium silicate available from Cypress Minerals Co., Los Angeles, California.
[12]FEF Black is carbon black having particles with diameters in size range of 30-40 × $10^{-6}$ mm available from Phillips Petroleum Co., Bartlesville, Oklahoma.
[13]HAF Black is carbon black having particles with a diameter of 27-29 × $10^{-6}$ mm, available from Phillips Petroleum Co.
[14]Available from Owens Corning Fiberglas Corp., Toledo, Ohio.

The formulations were made using a Banbury Mixer technique as described in U.S. Pat. No. 4,373,048, which is incorporated by reference herein.

The Banbury Mixer technique has one and two pass systems both of which start by introducing the polymer into the mixer to be softened by shear and heat. Then fillers and dry ingredients are added and mixed until a homogeneous mixture is obtained. Thereafter, the liquid components are added and mixed to achieve a homogeneous mixture. At this point for the two pass system, the mixture is removed and cooled, after which it is reintroduced to the mixer and at a lower temperature the catalyst or curing agents are added in the second pass and the mixture can be stored and subsequently placed in mold to achieve the necessary curing and cross linking. In the one pass system, the catalysts or curing agents can simply be added and the mix subjected to molding and allowed to cool.

Other materials which are believed to be useful in practicing this invention include, but are not limited to, other polypropylenes, glass reinforced polybutylene terephthalate, glass reinforced and un-reinforced nylon, and reinforced polyolefinic elastomers, for the rigid materials; and copolyester thermoplastic elastomers, styrene terpolymers, and interpenetrating network polymers of olefinic-based elastomers with silicon for flexible materials.

It is to be understood that many variations of the present invention may be utilized without departing from the spirit and scope of the present invention. For example, differing shapes of connecting housings such as rectangular and/or oblong may be utilized as well as different sizes. Additionally, the contact apertures may vary in size and/or shape from housing to housing and with respect to each other. Also, a contact and housing arrangement may be utilized in conjunction with bulkhead connectors, circuit boards, and may therefore only require one connector and housing as opposed to the pair shown in the drawings. Further, other types of contact arrangements may be utilized which may include the use of cables other than electrical cable such as, for example, fiber optics, adaptor· arrangements wherein socket or pin contacts are disposed at both ends of a connector or a combination thereof.

Therefore, in addition to the above enumerated advantages the disclosed invention produces an environmentally sealable connector which is suitable for a multitude of uses and which is cost effective as well as easy to manufacture.

In the drawings and specification, there has been set forth preferred embodiments of the invention, and although specific terms are employed, they are used in a generic and descriptive sense only, and not for purposes of limitation.

We claim:

1. A mold for making a member having at least one first section of a first material and at least one second section of a second material comprising:
   first and second plate means adapted to cooperate with each other when positioned in opposing relationship along a mold-closing axis, said first and second plate means being reciprocally movable relative to one another along said axis during a molding cycle, said first and second plate means being engageable with each other and defining a member-forming area therein when said mold is in a closed position, said member-forming area having at least a portion of a first section in one of said plate means and at least a portion of a second section in the other of said plate means;
   at least one first and at least one second sprue means in said first and second plate means in communication with said portions of said first and second sections respectively of said member-forming area, said sprue means being adapted for introducing said first and second materials respectively into desired portions of said member-forming area; and
   ejector means for ejecting an eventually molded part upon completion of a molding cycle, said ejector means being movable into said member-forming area during ejection of said molded part, said ejector means being adjacent said member-forming area and including one surface defining a boundary portion of said member forming area;
   said ejector means being positionable in a first position with said one surface defining a boundary portion of said first section of said member-forming area into which said first material is introducible through said at least one first sprue means while another surface of said ejector means blocks said at least one second sprue means, and
   said ejector means being positionable in a second position with said one surface defining a boundary portion of said second section of said member-forming area into which said second material is introducible through said at least one second sprue means after said another surface is moved to uncover said at least one second sprue means,
   whereby said ejector means for ejecting the eventually molded part also serves to effectively close off one or more of the sprue means during a first stage of the molding process and also defines an outer surface of the eventually molded part.

2. The mold of claim 1 wherein said ejector means is a sleeve movably disposed in one of said plate means such that a part of said sleeve defines said one surface of said ejector means.

3. The mold of claim 1 further including passageway-forming core pins having a first portion disposed in one of said plate means and a second portion extending into said member-forming area and adapted to form passageways extending through said first and second sections of the member formed in the member-forming area.

4. The mold of claim 3 wherein said core pins are aligned with said mold-closing axis, and respective portions of said pins coextend from said one surface of said ejector means to define respective continuous passageway portions of said first and second sections of the eventually molded part.

5. A mold for making a member having at least one first section of a first material and at least one second section of a second material comprising:

first and second mold halves adapted to be reciprocally movable along a mold-closing axis to meet at an interface to define a member-forming area within said mold when said mold is in a closed position, said member-forming area including at least one first molding portion for receiving said first material and at least one second molding portion for receiving said second material;

at least one first and at least one second sprue means in said first and second mold halves in communication with respective ones of said first and second molding portions in said member-forming area, said at least one first and second sprue means being adapted for introducing said first and second materials respectively into desired portions of said member-forming area; and ejector means for ejecting an eventually molded part upon completion of a molding cycle, said ejector means being movable into said member-forming area during ejection of said molded part, said ejector means being adjacent said member-forming area and including one surface defining a boundary portion of said member-forming area;

said ejector means being positionable in a first position with said one surface defining a boundary portion of said first molding portion of said member-forming area into which said first material is introducible through said at least one first sprue means while another surface of said ejector means blocks said at least one second sprue means, and said ejector means being positionable in a second position with said one surface defining a boundary portion of said second molding portion of said member-forming area into which said second material is introducible through said at least one second sprue means after said another surface is moved to uncover said at least one second sprue means, whereby said ejector means for ejecting the eventually molded part also serves to effectively close off one or more of the sprue means during a first stage of the molding process and also defines an outer surface of the eventually molded part.

6. The mold of claim 5 wherein at least one of said first and second mold halves includes a further member-forming section and said mold further includes a cylindrical member movably disposed in one of said mold halves, said cylindrical member extending into at least a part of said first molding portion, said cylindrical member blocking access to said further member-forming section during the insertion of said first material into said first molding portion, said cylindrical member being movable to unblock access to said further member-forming section during insertion of said second material into said member-forming area whereby said second material may also be inserted into said further member-forming section.

7. The mold of claim 5 further including passageway-forming core pins having a first portion disposed in one of said first and second mold halves and a second portion extending into said member-forming area and adapted to form passageways extending through said first and second sections of the member formed in the member-forming area.

8. The mold of claim 7 wherein said core pins are aligned with said mold-closing axis, and respective portions of said pins coextend from said one surface of said ejector means to define respective continuous passageway portions of said first and second sections of the eventually molded part.

* * * * *

UNITED STATES PATENT AND TRADEMARK OFFICE
CERTIFICATE OF CORRECTION

PATENT NO. : 5,074,771

DATED : December 24, 1991

INVENTOR(S) : Anil C. Thakrar et al.

It is certified that error appears in the above-identified patent and that said Letters Patent is hereby corrected as shown below:

In the Abstract:

Line 14 - delete the word "mold" and insert the word --molded--.

Signed and Sealed this

Twentieth Day of April, 1993

Attest:

MICHAEL K. KIRK

*Attesting Officer*  *Acting Commissioner of Patents and Trademarks*